C. AMBRUSTER.
ELECTRICAL CONTROL APPARATUS.
APPLICATION FILED SEPT. 26, 1913.

1,189,771.

Patented July 4, 1916.
3 SHEETS—SHEET 1.

WITNESSES:
Rob' R Kitchel
Frank E French

INVENTOR
Cornelius Ambruster
BY
Augustus B. Stoughton.
ATTORNEY.

C. AMBRUSTER.
ELECTRICAL CONTROL APPARATUS.
APPLICATION FILED SEPT. 26, 1913.

1,189,771.

Patented July 4, 1916.
3 SHEETS—SHEET 2.

WITNESSES:

INVENTOR
Cornelius Ambruster
BY
Augustus B. Stoughton.
ATTORNEY.

C. AMBRUSTER.
ELECTRICAL CONTROL APPARATUS.
APPLICATION FILED SEPT. 26, 1913.

1,189,771.

Patented July 4, 1916.
3 SHEETS—SHEET 3.

WITNESSES:
Rob't R Kitch
Frank E Funch

INVENTOR
Cornelius Ambruster
BY
Augustus B. Stoughton.
ATTORNEY.

UNITED STATES PATENT OFFICE.

CORNELIUS AMBRUSTER, OF ROSLYN, PENNSYLVANIA.

ELECTRICAL CONTROL APPARATUS.

1,189,771.   Specification of Letters Patent.   Patented July 4, 1916.

Application filed September 26, 1913. Serial No. 791,953.

*To all whom it may concern:*

Be it known that I, CORNELIUS AMBRUSTER, a citizen of the United States, and a resident of Roslyn, in the county of Montgomery and State of Pennsylvania, have invented certain new and useful Improvements in Electrical Control Apparatus, of which the following is a specification.

The principal objects of the present invention are to provide a master switch which shall be small or compact and thus occupy little room on the switch-board where it may be assembled along with other instruments and used, for example, for the purpose of controlling a storage battery end cell switch; to provide for variously illuminating the exposed marking on the master switch in order to indicate the position of the controlled part, such as the end cell switch and in order to indicate the direction in which the control system is working and also the fact that it is working properly; to guard against placing the master switch in any other than its proper position for governing the control system, to accomplish these objects without adding additional contacts to the electrical control system which as is well understood by those skilled in the art would be an undesirable and disadvantageous thing to do, and to provide a master switch in the operation of which it is only necessary to turn it to the marking that corresponds with the position of the end cell switch or controlled part desired and to then observe the character of the illumination of that part in order to ascertain, if desired, that the control mechanism is making or has completed the required change in the proper direction.

The invention will be claimed at the end hereof, but will be first described in connection with the embodiment of it, chosen from among other embodiments, for illustration in the accompanying drawings, in which—

Figure 2:
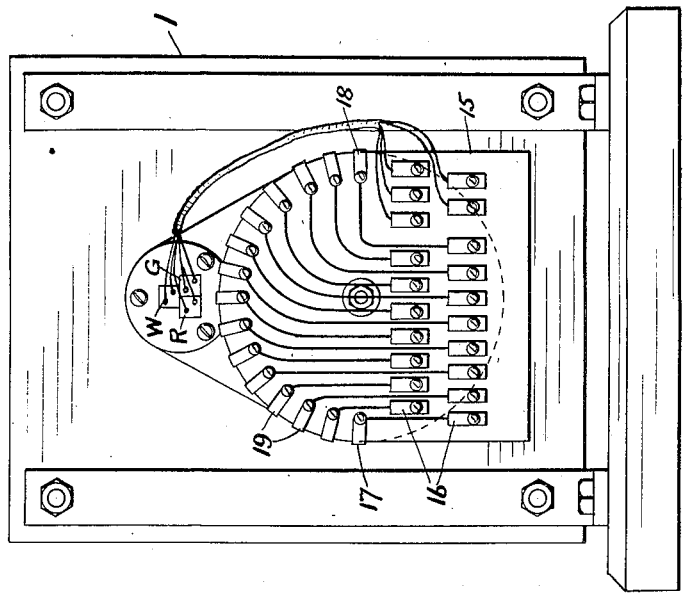
Figure 1:
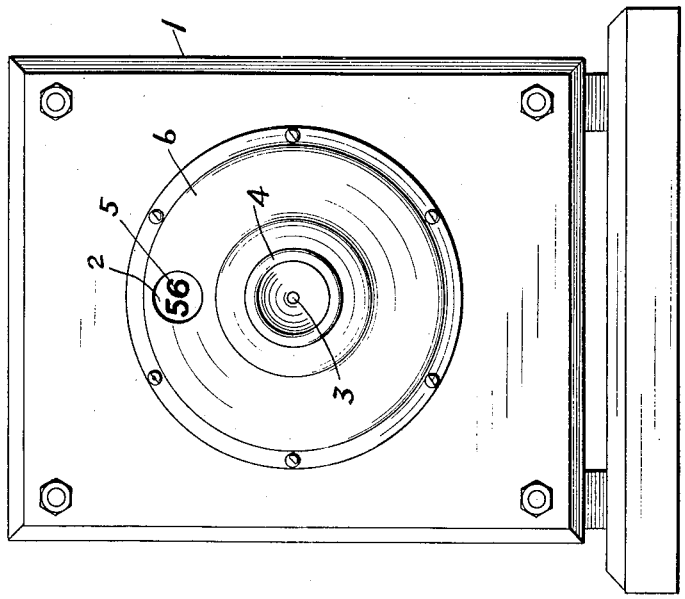
Figure 3:
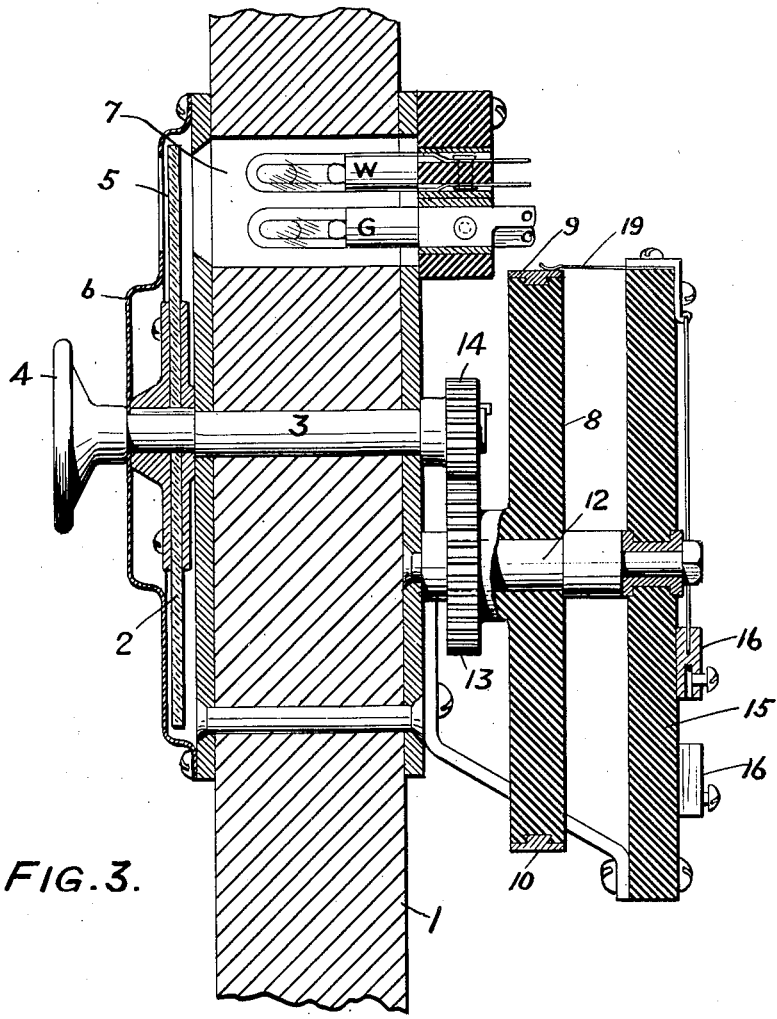
Figure 4:
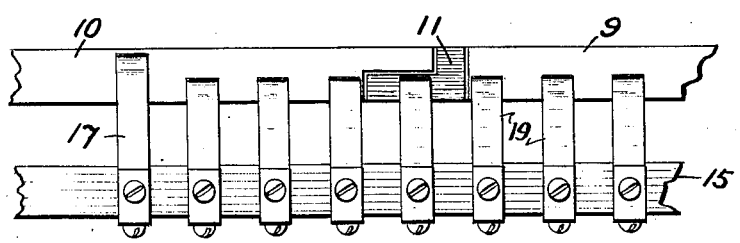
Figure 6:
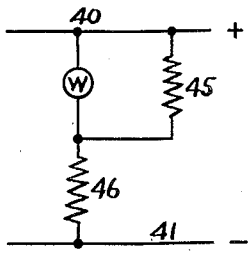
Figure 7:
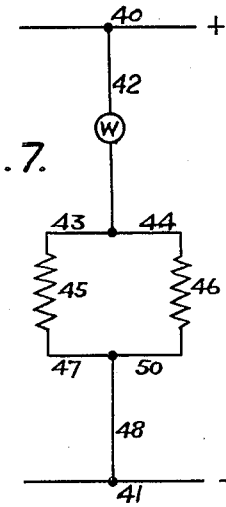
Figure 5:
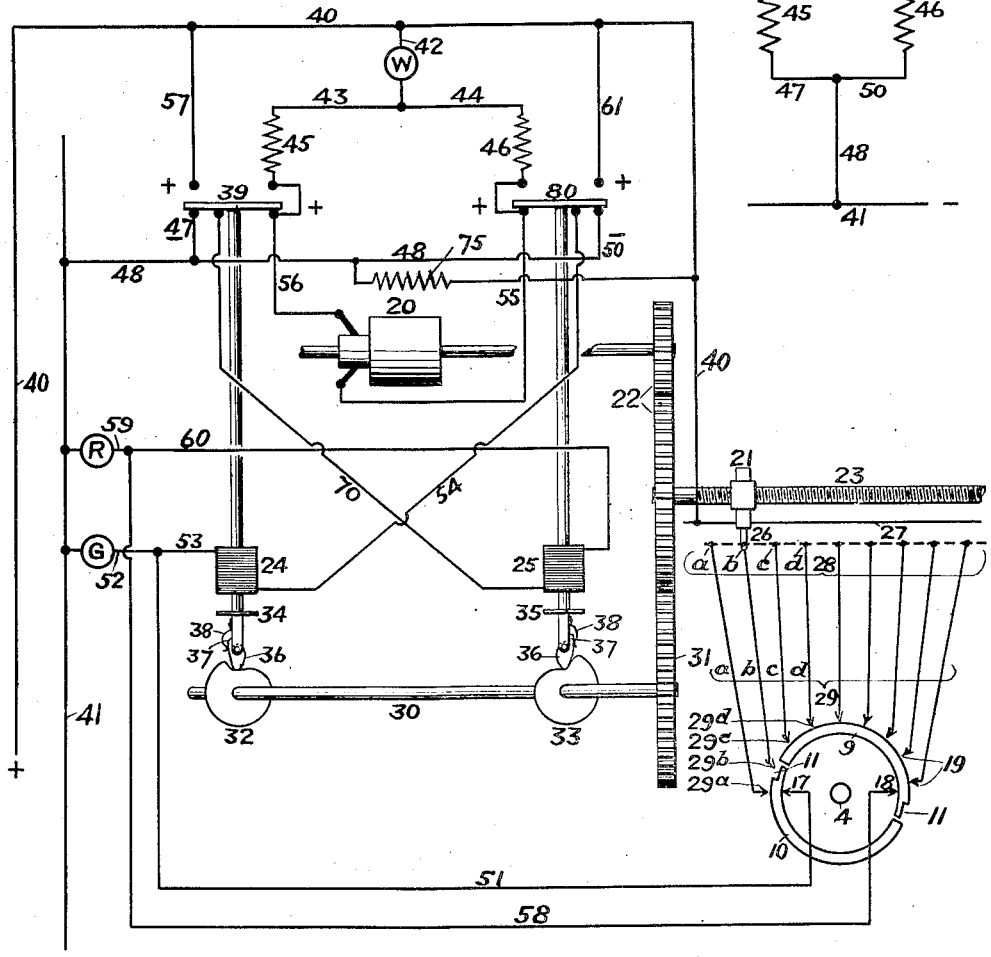

Figure 1, is a front view of the master switch. Fig. 2, is a rear view of the same. Fig. 3, is a sectional view, drawn to an enlarged scale, and illustrating details of construction of the master switch. Fig. 4, is a development of the circular contacts shown at the right in Fig. 3. Fig. 5, is a diagrammatic view illustrating the application of the master switch to an electrical control system, including the means for controlling the lights or lamps by which the master switch is illuminated, and Figs. 6 and 7, are diagrammatic views conventionally illustrating changes or adjustments of resistance in one of the lamp circuits, so as to cause the lamps to burn brightly or to be dimmed.

In the drawings 1 is a switch panel or other appropriate support.

2, is a disk fast on a spindle 3 which can be turned by a handle 4. On the face of the disk there is a circle of markings 5. The housing 6 covers the disk and is provided with an opening through which the markings 5 are made visible, one at a time, by turning the disk.

W, R and G are three lights arranged in a cavity 7 and disposed so as to illuminate the marking on the disk which is exposed. For this purpose the disk may be made of opaque glass and have the markings or numbers painted on it.

8, is a disk carrying two semi-circular segments 9 and 10, insulated from each other at the ends thereof and at the abutting ends there is a fitting piece 11 so as to preserve substantial mechanical continuity of the rim, which electrically considered comprises two semi-circular segments insulated from each other. This disk 8 is revoluble on a stud 12 and is fast to a toothed wheel 13 which meshes with a toothed wheel 14 fast on the spindle 3. The ratio of the toothed wheels 13 and 14 is such that one revolution of the spindle 4 in either direction turns the disk 8 a half revolution, or in other words, the ratio is two to one.

15, is an insulating fixed support carrying a semi-circle of contacts which bear upon the segments 9 and 10 according to the position of the part 8. The support is also provided with terminal connections 16 for the various contacts and for the lamps G, R and W.

Referring now more particularly to Fig. 5, the contacts 17 and 18 may each contact with either one of the segments 9 and 10 but may not both contact with the same segment at the same time. Of the contacts 19, one is always on one of the insulated parts 11 and the others, some or all of them, may be on either of the segments 9 and 10, depending, of course, upon the position to which the handle 4 is turned. This result is also insured by properly spacing the markings 5 in respect to the opening in the cover 6, so that the handle will be stopped in position to expose a marking while at the same time the disk 8 will be stopped in position for insuring the described arrangement of contacts. 20 is a motor equipped with a field 75, arranged as to be excited always in one direction and geared to the contactor 21 as by the gear wheels 22 and screws 23, so that when the motor is at rest the contactor is at rest and when the motor runs in one direction the contactor travels in one direction and when the motor runs in the other direction the contactor travels in the other direction. 24 and 25 are motor controlling magnets so arranged that when neither is energized the motor and contactor 21 are at rest, but when either one is energized the motor runs in one direction or the other and the contactor travels in one direction or the other. It so happens that the magnet 24, when energized, causes the contactor to travel toward the right, in Fig. 5, and when the magnet 25 is energized the contactor 21 travels toward the left. The contactor 21 carries a brush 26 in contact with a continuous conductor or contact rail 27 and adapted in traveling to contact with a row of contacts 28, having blanks between them. Each of the contacts 28 is connected by an appropriate conductor 29 with one of the contacts 19. 30 is a cam shaft driven from the motor as by a toothed wheel 31 and carrying oppositely arranged cams 32 and 33. The cores or armatures 34 and 35 are each provided with a pivotal dog 36 free to turn in one direction but restrained from movement in the other direction by the heel 37 and the spring 38. The speed of rotation of the cam shaft 30 is so timed that one or the other of the cams 32 and 33 will hold up the corresponding armature according as the shaft runs in one direction or the other during the interval of the passage of the brush 26 from one contact to the next contact of the row of contacts 28. The cam which is not holding up an armature is inoperative because of the turning into inoperative position of its complemental dog 36. The armatures 34 and 35 operate switches 39 and 80.

The mode of operation will be described and it is believed that an explanation of the circuits can be made more clearly in connection with that description, so that such course will be pursued.

For the sake of clearness it may be suggested that the screw 23 is the screw of an end cell switch and in consequence it operates to determine the cells which are included and excluded from the battery circuit and it will be assumed that the numbers on the disk 2 correspond with numbers applied to the various end cells. The operator turns the handle 4, having regard to the exposed marking on the disk 2. In doing this he positions the segments 9 and 10 in respect to the contacts which bear upon them. The position of the segments determines whether either of the magnets 24 or 25 is energized or whether both of them remain un-energized. The magnets determine whether the motor shall run or not and if so, in which direction it shall run, and the motor controls the movement of the contactor 21. When the motor is at rest the light W, which may be said to be white, is sufficiently bright to illuminate the number exposed on the master switch. When the motor is running in one direction, one of the lights R and G, which may be red and green, is lighted so as to indicate which way the switch is running and is flickered so as to show that the switch is running, while at this time the light W is dimmed. Fig. 5, is an illustration of the condition of the parts and circuits when everything is at rest.

40 is one of the leads and 41 is the other of the leads connected with an appropriate source of current, not shown. The lead 40 is, for convenience, assumed to be positive and the lead 41 negative. There is a circuit from the lead 40 by way of 42 through the lamp W. This circuit divides into branches 43 and 44 and in each branch there is a resistance 45 and 46. From the branch 45 the circuit is through the switch 39 to the conductor 47 and thence to the conductor 48 to the conductor 41. From the resistance 46 the circuit is through the switch 80 by the conductor 50 to the conductor 48 and thence to the conductor 41.

Fig. 7, diagrammatically shows this circuit and it is evident that the resistances 45 and 46 are in parallel relation with respect to each other and are in series with the lamp W. The resistance of the lamp and of the two resistances arranged in the manner described is such that sufficient current passes through the lamp for causing it to burn brightly and thus illuminate the exposed marking on the disk 2, showing that the whole apparatus is at rest. There is no circuit to either of the magnets 24 and 25, because it is broken at the left-hand insulating part 11 and there is no circuit through the motor armature because there is no difference of potential across it. The motor field 75, however, is energized on account of being connected between 40 and 41.

It will be assumed that the handle 4 is turned so as to shift the segments 9 and 10 clock-wise in Fig. 5 sufficiently to bring the three left-hand contacts 19$^a$, 19$^b$ and 19$^c$ of the row 19 onto the segment 10 and the fourth contact 19$^d$ onto the insulation 11. Under these conditions there is a circuit from 40, contact rail 27, brush 26, conductor 29$^b$, segment 10, contact 17 and conductor 51. From the conductor 51 there is a branch 52 through the green light to the conductor 41, thus the green light receives current and is energized. There is also a branch 53 from conductor 51 through magnet winding 24, conductor 54 to switch 80 and from there to 41 by 50 and 48. The magnet 24 raises the switch 39. This produces two results: First:—it forms the circuit 40 through 57, through the raised switch 39, the conductor 56, the motor 20, the conductor 55, the lowered switch 80 to the conductor 50—48—41, thus running the motor in proper direction for shifting the contactor 21 toward the right, and second:— it connects the resistance 45 by the bridge 39 to the conductor 57. The circuit of the lamp W is now as indicated in Fig. 6; that is to say, the lamp and the resistance 45 are in parallel relation and are in series relation with the resistance 46. This value of the resistances is such that in this relation the current through the lamp W is not sufficient to cause it to burn brightly, hence it is dimmed and does not substantially illuminate the exposed marking on the disk 2. As the brush 26 travels toward the next contact the switch 39 is held up by the cam 32 and the brush 26 breaks the circuit through the magnet 24 and the lamp 52 before it reaches the contact toward which it is traveling, when the circuit is again reëstablished. This produces a flicker of the lamp G, which shows that the apparatus is operating. When the brush reaches this next contact 28ᶜ, the circuit is again made and although the cam 32 is in position for letting the switch 39 drop, the magnet 24 being now reënergized holds it up while another cycle of operation starts. When the brush reaches the contact 19ᵈ, which is in contact with the insulation 11, the magnet circuit is not reëstablished and the switch 39 drops as soon as the cam 32 reaches it so that the light G remains extinguished and the parts that control the circuit occupy the positions first described in which the light W is burning brightly. If the knob or handle 4 were turned in the opposite direction, one point as shown in Fig. 5, the segments 9 and 10 would be turned in counter-clockwise direction and the operation in that case would be substantially as has been described, but the motor would have run in the reverse direction. In the case last mentioned the circuits are from 40 by 27 by 26, by 9, by 18, 58 and thence branching and one branch 59, going through R to 41, the other branch 60 going through the magnet 25 by 70, through switch 39 (in lowered position), 47 and 48 to 41. The magnet 25 being then energized lifts the switch 80, establishing a circuit by 61, 80, 46 and 44, putting the resistance 46, instead of the resistance 45 as before, in parallel with the lamp W, thus dimming it, and also establishing a circuit from 41, 48 by 47, 39, 56, 55 and armature 20, and raised switch 80 and 61 to 40 for the motor, which runs as before described except in the opposite direction. The cam 33 and accessories operate as has been described in connection with the other cam, as do also the other parts. The object of the cross-connections 54 and 70 is that when one magnet is magnetized and raises its switch the path for a circuit for the other magnet is broken and thus the unintentional magnetizing of the last mentioned magnet is rendered impossible.

Referring to the circuit of the lamp W and its resistances, it may be remarked that it is controlled through the upper and inner contacts of the switches 39 and 80, which must be provided for the motor circuit so that additional contacts are not required.

It will be obvious to those skilled in the art to which my invention relates that modifications may be made in details of construction and arrangement without departing from the spirit of the invention, hence the invention is not intended to be limited further than the prior state of the art may require.

What I claim is:

1. An electrical control system comprising the combination of a motor and two motor controlling magnets and their circuits, a signal lamp and two resistances therefor, direction switches respectively operated in response to the magnets and having contacts and connections for including said resistances in parallel relation and in series with the lamp to light the latter when the switch positions are in one relation and for putting the lamp and one resistance in parallel relation and in series with the other resistance to dim the lamp when the switch positions are in another relation.

2. In an electrical control system the combination of a master switch having a marked dial of which one marking is indicated at a time, rest and direction lamps for illuminating the exposed marking, a resistance for the rest lamp, direction switches having contacts and circuits for varying the combination of said resistance to light the rest lamp when the switches are in one relation and for dimming it when the switches are in another relation, magnets for the switches, circuit connections common to the magnets and direction lamps, and circuit connections from the master switch for energizing either of the last mentioned circuits.

3. In an electrical control system the combination of a spindle capable of more than half a revolution in either direction and having a circular dial provided with markings and of which only one is indicated at a time, conducting segments none of which exceeds one hundred and eighty degrees, a row of contacts coöperating with said segments, gearing interposed between the spindle and segments whereby a rotation of the spindle in either direction produces a less rotation of the segments, and circuit connections controlled by said segments and row of contacts.

4. The combination in an electrical control system of a controlled part, signal lamps for indicating rest or direction of motion of the controlled part, magnet controlled switches for controlling the controlled part and circuits interconnected to these lamps and switches and controlled part and responsive to the actual motion of the controlled part for intermittently lighting the direction signal lamps.

5. The combination of a moving part and an indicator for same provided with a screen capable of transmitting light, lamps for illuminating the said screen, color screens interposed between said lamps and said screen, circuits provided with contacts interconnected with the moving part and the lamps and so arranged as to indicate direction of motion of moving part by the color of the illumination and actual motion of the moving part by intermittent flashing of said lamps.

6. The combination in an electrical control system of a master switch, a controlled part having devices and circuits and adapted to be moved thereby into any position allowed by previous fixing of the master switch, lamps of which one shows by illumination that control part is in the position indicated by the position of the master switch and of which others show by flickering illumination in which direction the part is actually moving in response to the previous setting of the master switch, and circuits for said lamps controlled by the moving part and its actuating devices and circuits.

7. In an electrical control system the combination of a movable controlled mechanism, a master switch for operating said mechanism, and three signal lamps whereof one is provided with circuit connections for lighting the lamp when the mechanism is at rest and whereof the other two are provided with circuit connections whereby said lamps are selectively responsive to direction of motion of said mechanism and intermittently responsive to said motion.

8. The combination in an electrical control system of operating mechanism including a controlled movable part, a master switch for controlling said mechanism and determining the positions to which the movable part is to be moved, lamps having circuits controlled and interrupted by the operation of said mechanism to indicate by flickering that said mechanism is responding by actual movement in the direction required by the position of the master switch, and a lamp having a circuit controlled by the starting and stopping of said mechanism for indicating that the movement determined by said master switch has been completed.

9. The combination in an electrical control system of operating mechanism including a controlled movable part, a master switch for controlling said mechanism and determining the positions to which the movable part is to be moved, signal lamps and contacts and conductors arranged to provide circuits dependent upon the positional relation of the master switch and controlled part for selectively lighting said lamps to indicate such positional relation and for intermittently flashing certain of said lamps during motion of controlled parts.

CORNELIUS AMBRUSTER.

Witnesses:
A. B. STOUGHTON,
FRANK E. FRENCH.